United States Patent [19]

Baumann et al.

[11] Patent Number: 6,145,804
[45] Date of Patent: Nov. 14, 2000

[54] DEFINED FINE-MEMBERED AND POINT-FOCAL TEMPERABLE MOLDS AND TOOLS

[75] Inventors: Frithjof Baumann, Renningen, Germany; Dietmar Volkle, Kreuzlingen, Switzerland

[73] Assignee: Fraunhofer-Gesellschaft zur Forderung der angewandten Forschung e.V., Munich, Germany

[21] Appl. No.: 09/019,669

[22] Filed: Feb. 6, 1998

[30] Foreign Application Priority Data

Feb. 7, 1997 [DE] Germany ............... 197 04 700

[51] Int. Cl.⁷ .................................... B22D 27/04
[52] U.S. Cl. ................. 249/79; 164/128; 164/348
[58] Field of Search .................... 164/348, 122, 164/125, 126, 127, 128; 249/79; 425/547, 548, 552

[56] References Cited

U.S. PATENT DOCUMENTS 5,562,846  10/1996  McKeen .

FOREIGN PATENT DOCUMENTS

| | | |
|---|---|---|
| 2 159 231 | 6/1973 | France . |
| 29 19 683 A1 | 7/1976 | Germany . |
| 25 03 105 B2 | 10/1979 | Germany . |
| 31 03 890 | 11/1982 | Germany . |
| 0 361 390 A2 | 4/1992 | Germany . |
| 0 361 390 B1 | 12/1996 | Germany . |
| WO97/15434 | 5/1997 | WIPO . |

OTHER PUBLICATIONS

European Patent Office Search Report for Patent No. 98102019.1, dated Jan. 11, 2000

*Primary Examiner*—Kuang Y. Lin
*Attorney, Agent, or Firm*—Testa, Hurwitz, and Thibeault, LLP

[57] ABSTRACT

The invention concerns thermoregulated molds and tools with a defined, fine-branched and point-focal interior heat-transferring conduit, process for their production, their use and process for the thermoregulation of molds and tools. According to the invention, these molds and tools contain on the inside a thermoregulating conduit in configuration of an arterial vessel system, through which an appropriate heat-transferring medium flows for heating or for cooling. The production of these molds and tools is conducted by means of rapid prototyping processes, particularly stereolithography.

21 Claims, 3 Drawing Sheets

ARTERIAL THERMOREGULATION

DEFINED FINE-MEMBERED AND POINT-FOCAL TEMPERABLE MOLDS AND TOOLS

BACKGROUND OF THE INVENTION

The invention concerns thermoregulated molds and tools with defined, fine-branched and point-focal interior heat-transferring conduit, process for their production, their use, process for thermoregulation of molds and tools and thermoregulating system. It relates to the field of thermoregulation of materials, components or the like. It can be utilized in those cases where the temperature of a mold, a component, or a material is controlled in a defined and uniform manner and, in particular, where heat must be drawn off.

Particularly appropriate is the application of the invention to shaping, particularly to the thermoregulation of molds and shaping tools, and to the thermoregulation of intensely heat-stressed components, e.g., for cooling of internal combustion engines. Accordingly, the application of the invention is particularly appropriate in plastics processing, metallurgy, and engine and automobile manufacturing. For the thermoregulation of molds and tools, particularly in plastics processing, channels or ducts are introduced into a shaping tool (for example, Menges, Georg "Instructions for the construction of injection molding tools" in Menges/Mohren—3rd completely reworked and expanded edition, Hanser Publishers Munich/Vienna, 1991 or DE 4,408,707 or "Cooling channels follow the contour of the mold part" in Zeitschrift Kunstoffe 87 (1997) 1, pages 36 to 37) and a heat-transferring medium is flushed through these channels. The molds and tools can be heated or cooled by means of the medium. For example, molds and tools are heated in the process of production of duroplastics, whereas tools are frequently cooled in the process of production of thermoplastics. Cooling of tools may also be used in aluminum diecasting.

Thermoregulation of molds and tools entails adjusting the temperature to a desired degree. This is accomplished by introducing a substance inside the mold or the tool. Thermal exchange between the mold or the tool and the substance results in a drop or increase of the mold's or the tool's temperature.

Due to limited manufacturing possibilities, existing thermoregulating systems can only achieve inhomogeneous thermoregulation, which frequently causes product defects. For example, inhomogeneous thermoregulation results in incomplete filling of molds in plastics processing. Another disadvantage of existing thermoregulating systems is their inability to shorten the thermoregulation cycle during the manufacturing process.

SUMMARY OF THE INVENTION

The invention takes on the task of proposing molds, tools or components containing a thermoregulating system, which allows to achieve homogeneous thermoregulation and avoid most of the problems associated with thermoregulation. The present invention further allows shortening the thermoregulation cycle during the manufacturing process.

According to the invention, those objectives that concern molds and tools are resolved according to claims 21 through 27, those that concern the use of the molds and tools are resolved according to claims 28 through 35, and those that concern the process for thermoregulation are resolved according to claims 36 through 41.

According to the present invention, molds and tools contain on the inside a heat-transferring conduit in the configuration of an arterial vessel system. It is one aspect of the invention that such conduit is configured so that it branches out in the heat-transferring zone from vessels similar to arteries of large diameter down to very small vessels, and that connects outside the heat-transferring zone to vessels similar to veins. It is important to make the molds and tools containing a thermoregulating arterial vessel system according to the present invention from a material capable of being processed by means of at least one rapid prototyping process. Examples of these materials include plastic, metal, paper, ceramics and their mixtures.

In addition, it is another aspect of the present invention that the heat-transferring conduit is installed in the molds and tools in such a way that a very finely-branched network of passages similar to capillaries having diameters down to approximately 20 $\mu$m is located directly beneath the surface of the molds and tools to be thermoregulated. The branching then decreases towards the interior of the mold or the tool and the diameter of vessels increases as a function of tool size up to approximately 100 mm, so that the capillary-type passages are gradually transformed into the artery-type passages. Several inlets and outlets can be provided per arterial vessel system. This is true also for the specific embodiments of the present invention.

For specific applications, it is advantageous to install several arterial vessel systems in a single mold or a tool to enable thermoregulation of the surface by segments. In one embodiment of the present invention, several arterial vessel systems are installed in a single mold or a tool. These systems overlap directly below the surface so that it is possible to equalize the temperature at the surface of the mold or the tool across the boundaries between the parts of the mold or the tool where each individual system is installed. Such configuration allows either to bring the entire surface of the mold or the tool to the same temperature or to maintain different segments of the mold or the tool at different temperatures. In another embodiment of the invention where only one segment of the surface of the mold or the tool needs to be thermoregulated, it may be sufficient to install a single arterial vessel system under the surface of this segment.

It is another aspect of the present invention that all inlets of the thermoregulating arterial vessel system are connected to its outlets with a device positioned in between outside the mold or the tool. The device causes the heat-transferring medium to circulate between the inlets and outlets, and also adjusts the temperature of the heat-transferring medium to the desired degree.

The production of molds and tools, according to the present invention, is conducted by means of rapid prototyping processes, e.g., stereolithography (SLA), laser sintering (SLS), LOM (laminated object manufacturing), FDM (fused deposition modeling), and MJM (multi jet modeling). These processes entail building three-dimensional physical models directly from the data of computer-aided design software. In these layered manufacturing processes a product is assembled by layers, i.e. thin cross-sections of the product are manufactured and then fastened together.

Methods for producing plastic or wax models directly from the data of computer-aided design software are known in the art. These methods are primarily used for visual verification of certain parameters of the product. Rapid prototyping processes for processing metals have been recently introduced. One distinguishes between design prototypes, which serve above all for the three-dimensional evaluation of design drawings, geometric prototypes, in which dimensional and shape accuracy is verified, and functional prototypes, which allow testing functionality of the product.

The geometric data set of the three-dimensional model is broken down into individual cross-sections of defined height for construction of the component. The distances between the cross-sections correlate with the optimal layer thickness in the subsequent construction process. This method allows to define the locations of specific cutting planes of the component, and to add material onto these planes. The above-described rapid prototyping processes are distinguished by the type and manner of the addition of the material.

The present invention utilizes the fact that in all higher life forms, thermoregulation is achieved by means of finely-branched vessel systems reaching up to directly below the surface, for example, the system of blood vessels in humans. This complicated system of vessels was previously impossible to adequately reproduce artificially because of its complexity. However, it can be achieved now due to the possibilities offered by the rapid prototyping process.

Molds and tools, containing the above-described thermoregulating system, may be used advantageously, for example, as thermoregulated casting molds, as shaping tools for hot and cold deformation, such as rollers, or as thermoregulated machine elements in thermodynamic systems or power engines, e.g., in internal combustion engines. These molds and tools can be made of various materials, e.g. plastic, metal, paper, ceramics and their mixtures, but must be capable of being produced by rapid prototyping or similar processes.

The actual thermoregulation of molds and tools is achieved in a way known in the art. The arterial vessel system according to the present invention is used to enable a circulation of a heat-transferring medium through the mold or the tool. This medium, which may be liquid, e.g., water, or gaseous, is heated or cooled to the desired temperature. It is possible to use a heat-transferring medium, for which a phase transformation from liquid to gaseous form takes place inside the arterial vessel system. For example, this is the case when the heat-transferring medium is $N_2$ or $CO_2$.

It is another aspect of the present invention that a circulation of the heat-transferring medium through the mold or the tool occurs repeatedly and that, after leaving the outlet of the mold or the tool, the heat-transferring medium is directed to a device, for example, a thermostat, in which the temperature of the heat-transferring medium is adjusted to the initial temperature before directing the medium to the inlet.

Layered manufacturing processes, e.g., rapid prototyping and, particularly, stereolithography, enable the production of molds and tools with an integrated arterial heat-transferring conduit. It is possible to form zones, in which a greater heat transfer is necessary, by means of a finely-branched heat-transferring conduit. A vessel system is installed in the mold or the tool, which branches out in the heat-transferring zone from vessels similar to arteries of large diameter down to very small vessels, and connects outside the heat-transferring zone to vessels similar to veins. The configuration of a vessel system, including the distance between the vessel and the surface of the mold, can be calculated using numerical methods by simulation of heat sources or sinks and can be directly integrated into the production of molds and tools. The medium circulating through the vessel system is brought to a predefined temperature after leaving the tool by means of a thermoregulating device before the medium is pumped backed into the system.

Layered manufacturing technologies of rapid prototyping also enable the production of similar heat-transferring conduits in other machine elements. As an example, cooling of combustion engines can be introduced. Suitable casting possibilities for metal, ceramics, composite materials or plastics enable the production of such conduits for the targeted cooling of the combustion chamber.

It is another advantage of the present invention that the temperature of the mold or the tool can be adjusted homogeneously over the entire surface. Furthermore, substantial flexibility of configuration of the rapid prototyping system, which cannot be achieved with conventional manufacturing methods, enables an optimal adjustment of the vessel system to the contour of the mold or the tool. The formation of product defects caused by temperature irregularities can thus be reduced. The groundwork is also laid out for the use of heat-sensitive materials. In particular, the sensitivity with respect to temperature shock can be increased. Also, the use of these thermoregulated molds and tools may shorten the thermoregulation cycle and, thus, may increase the efficiency of the mass manufacturing process.

Figure 1:
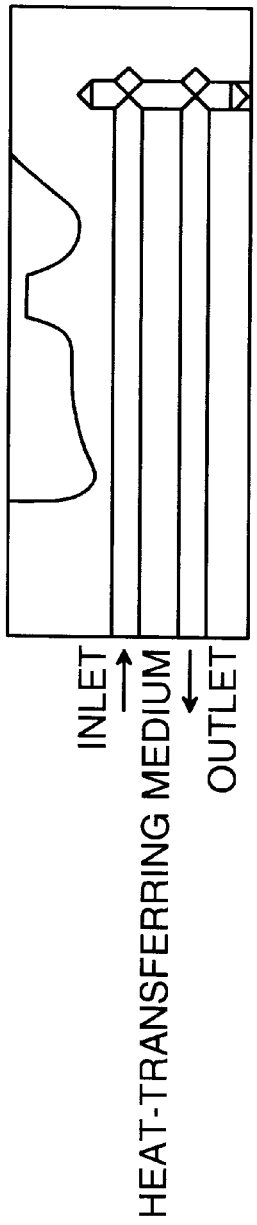
FIG. 1 shows a conventional tool construction according to the state of the art.
Figure 2:
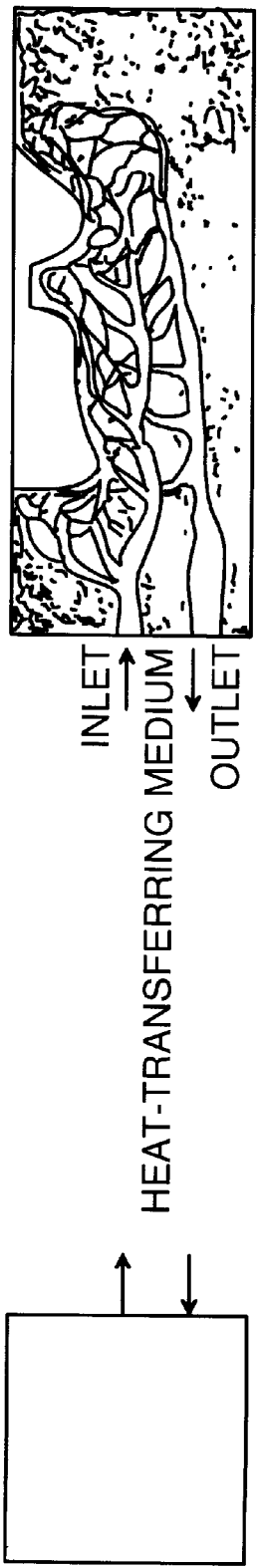
FIG. 2 shows an arterial tool construction according to the invention.
Figure 3:
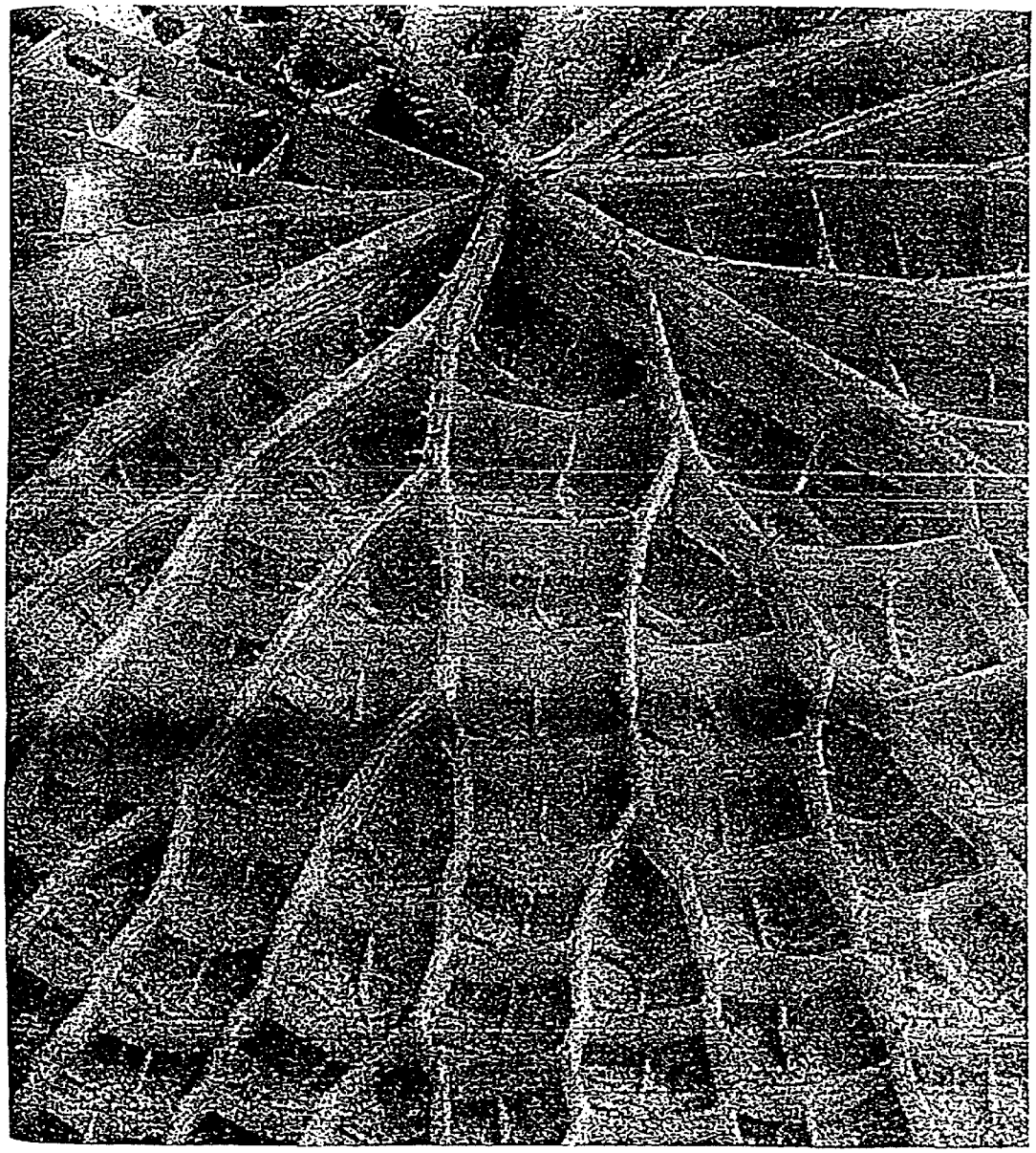
FIGS. 3, 4 and 5 represent variants of the arterial tempering structure of the invention.
Figure 4:
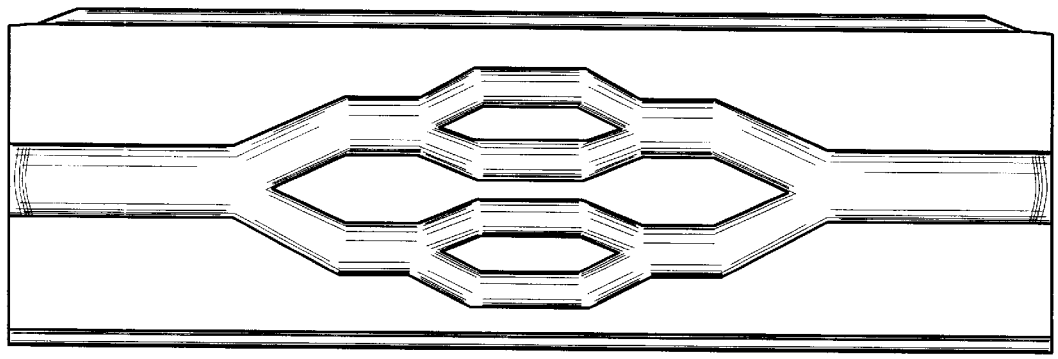
Figure 5:
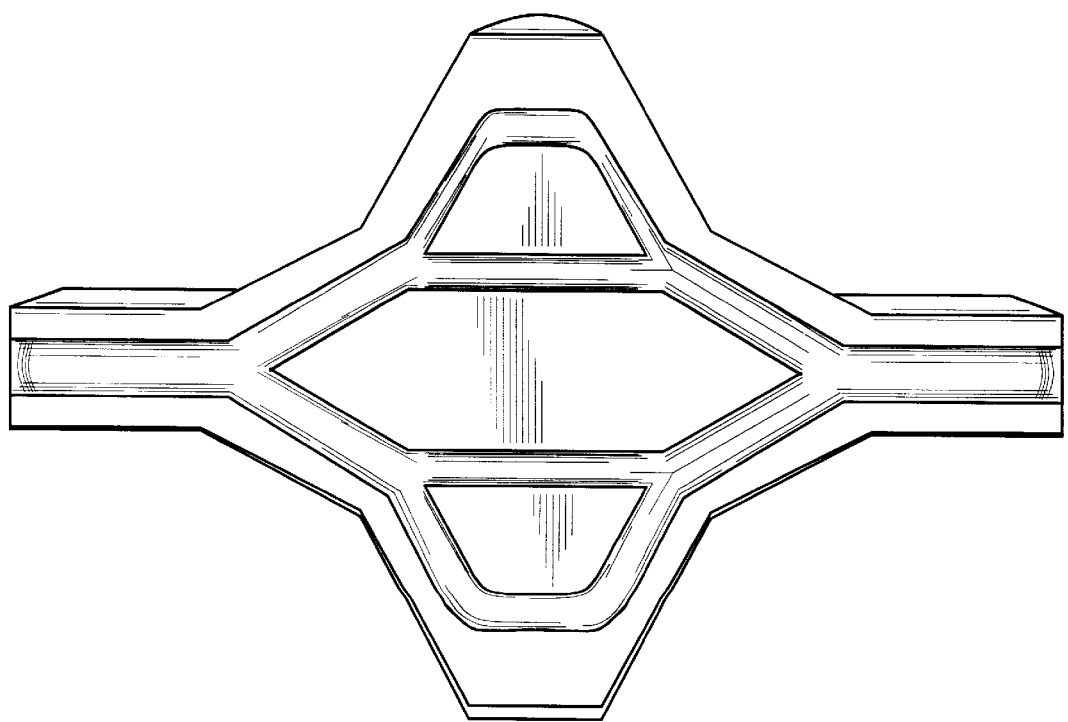

The invention will be explained in further detail in the following description of the embodiments.

DESCRIPTION OF THE EMBODIMENT

In order to be able to construct an arterial heat-transferring conduit, one must first seek for types of branching, which exist in nature, and recognize their regularities of angle and branch length.

Basically, branching structures can be found in three different fields.

1) Branching structures in living nature

Humans (e.g., the circulatory system)

Plants (e.g., leaves, branches, roots)

Animals (e.g., veins, extremities, feathers)

Colonies (e.g., corals, animal pathway systems, cocoons).

2) Branching systems in non-living nature

Crystal structure

Fracture patterns

Branching systems in water courses

Electrical discharges

3) Branching systems in technology

Transportation systems

Pathway systems (generative and complex pathway systems)

Pipelines

Electrical circuits

Optimized power transport systems.

Thus, for example, branching systems in trees are very complex and sometimes cannot even be mathematically described. Besides, each kind of trees has its own branching structure. Considering this complexity, we will limit ourselves here to the regularities of minimum flow energy expenditure with respect to the branching angle and the ratio of the diameters of corresponding branching ramifications. As a general rule, the smaller the branch, which branches off the main stem, the closer the angle of this split from the stem is to 90 degrees.

If a stem bifurcates into two branches of equal size, whereby the ratio of their diameters equals to one, the angle of this split is 60 degrees. If small branches form with a ratio of branch diameter to diameter of the base stem close to zero, then the angle of this split is nearly 90 degrees. The branching angle thus varies between 60 and 90 degrees.

However, now the question also arises with respect to the ratio of the diameters of the stem and the branch. Murray (see, e.g., Stevens, Peter S., "Forms in Nature", R. Oldenbourg Publishers, $2^{nd}$ Edition, 1988) assumed that the volumes of all branches and that of the stem are equal, thus:

$$d_0^3 = d_1^3 + d_2^3$$

By later experiments, in which branches were weighed out and their branching angles were re-measured, it was found that the exponent is not 3, but 2.5. This agrees with the results of other research, in which the branching angle approaches 60 degrees. This reinforces the assumption that to withstand a force of gravity tree branches bifurcate at narrowing angles.

If, however, one considers only the uniform transport of water, the exponent equals to 3. The explanation for this is the fact that the branches must offer more room for liquid transport than the stem, which nourishes them. This follows from the fact that the branches cause more resistance to the flow than the stem offers. The cross-sectional surface of the branches must be enlarged for the transport of the same quantity of liquid.

In the case of blood vessels, it was found that blood vessels maintain a very precise mathematical constant: the thinner branch-off vessels are related to the thicker vessels at the ratio of 0.8 to 1. This ratio appears to optimally reflect the fact that the more the drop in pressure and flow velocity is, the narrower are the channels.

The fine structure and flow ratios in blood circulation can be described as follows:

The aorta branches off the heart. It must absorb the pressure produced by the pumping heart, and it also must be able to withstand steep pressure fluctuations. Therefore, the aorta is well supported by its muscular walls permeated with connective tissue, and, in particular it can be flattened out if needed. The pressure normally reaches 100 mm mercury column, which corresponds to one-eighth the atmosphere pressure at sea level. The initial velocity of the blood at this point is 70 cm per second. Arteries, which are continuously thinner, branch off. Muscle cells and fibrous networks decrease in the arterial walls, the pressure drops to 80 mm mercury column, and the flow velocity is reduced to less than 10 cm per second. Next elements of the circulatory system are the arterioles, which are the terminal vessels of the arterial system with diameters of only 0.02–0.4 mm. They are formed by smooth muscle cells, which constrict the flow, and can be completely closed in certain circumstances. The pressure decreases to less than 30 mm mercury column, and the flow velocity reduces to only two mm per second. The finest terminal branches are capillaries. Their diameter may amount to less than five-thousandths of a millimeter: red blood cells must twist and deform during passage through them. The pressure falls here to less than 12 mm mercury column, and the flow velocity often decreases to less than ½-millimeter per second. The return of the blood to the heart occurs in reverse sequence: from the minimum-size vessels to the pipeline.

In producing molds or tools with integrated arterial cooling and heating conduits, the above-described types of branching appearing in nature are used as templates. One method for the production of molds and tools by rapid prototyping processes comprises designing a three-dimensional volumetric model, which contains the data for the spatial positioning of individual elementary components (squares, spheres, cones, or the like) to be put together to form the whole. Another method entails designing a volumetric unit by arranging the surfaces comprising the unit, whereby the spatial positioning of all surfaces is defined. The construction of molds and tools is conducted using either of the above-described methods, i.e., by defining and spatially arranging elementary components or surfaces. The arterial heat-transferring conduit is also described by a volumetric model. Then, the volumetric model of the heat-transferring conduit is merged with the volumetric model of the mold or the tool. As a result, the mold or the tool is formed with an integrated system of ducts, i.e. the desired heat-transferring conduit.

Molds or tools of simple shapes according to the invention are produced by building closed volumetric models of the mold or the tool and of the heat-transferring conduit, and, then by cutting the heat-transferring conduit out of the mold or tool. Design of the heat-transferring conduit is conducted in accordance with the above-described laws of nature. General common principles of branching are known the art, but have been described in detail only for tree branching.

The above method is not feasible for the production of complex shapes of molds and tools. In those cases, it is necessary first to simulate the anticipated process without the heat-transferring conduit. This simulation is conducted by means of a numerical finite element method known in the art of mold and tool construction. The results of such simulation then form the basis for the targeted design and construction of the arterial heat-transferring conduit. Desired additional conditions, such as a position of inlet and outlet openings for the heat-transferring conduit, the distance to the vessels from the surface of the mold, or the desired homogeneous temperature inside the mold are defined in advance and later incorporated in the design. This combination of simulation and construction was previously known only for optimizing the load of components. Lack of mathematical description of arterial systems in nature up till now is the reason why self-optimizing construction algorithms still do not exist.

What is claimed is:

1. Thermoregulated molds or tools in which heat transfer is conducted by means of a heat transferring medium capable of being introduced into the interior of the tool or the mold, said molds and tools defining a fine-branched and point-focal heat-transferring conduit in the configuration of an arterial vessel system which is in communication with one inlet and one outlet, through which the heat transferring medium is respectively introduced and discharged.

2. The molds or tools according to claim 1 wherein the fine-branched and point-focal heat-transferring conduit branches out in the heat transferring zone from passages with large diameters within the body of the mold or tool to fine passages located directly beneath the surface of the mold or tool and connects outside the heat-transferring zone to other passages.

3. The molds or tools according to claim 2 wherein the fine-branched and point-focal heat-transferring conduit comprises finely branched network of passages having diameters down to approximately 20 $\mu$m which are located directly beneath the surfaces of the molds and tools, wherein said passages branch out into other passages towards the interior of the mold or tool, wherein the diameter of said other passages increases as a function of the tool size to approximately 100 mm and the ramification of said network decreases.

4. The molds or tools according to claim 3 wherein the fine-branched and point-focal heat-transferring conduit is installed only under the surface of a segment of the mold or tool.

5. The molds or tools according to claim 3 wherein substantially the entire surface or large portion of the surface of said mold or tool is thermoregulated, wherein the pre-defined segments of the surface of said mold or tool are kept at different temperatures, and wherein said mold or tool defines separate fine-branched and point-focal heat-transferring conduits having separate inlets and outlets installed under each thermoregulated surface segment.

6. The molds or tools according to claim 1 wherein the fine-branched and point-focal heat-transferring conduit with the one or more inlets and outlets represents a circuit, in which a device for adjusting the temperature of the heat-transferring medium to the desired temperature is positioned outside the mold or tool between the outlet and the inlet.

7. The molds or tools according to claim 1 comprising thermoregulated shaping tools.

8. The molds or tools according to claim 7 comprising casting molds for producing components from molten material.

9. The molds or tools according to claim 7 comprising shaping tools for hot and cold deformation of metal components.

10. The molds or tools according to claim 7 comprising thermoregulated rolls.

11. The molds or tools according to claim 1 comprising thermoregulated machine elements.

12. The molds or tools according to claim 11 comprising thermoregulated machine elements in thermodynamic systems or power engines.

13. The molds or tools according to claim 12 comprising thermoregulated elements in internal combustion engines.

14. The molds or tools according to claim 13 wherein said elements are elements for cooling an internal combustion engine.

15. A process for thermoregulating of molds and tools comprising the steps of:

provinding a defined, fine-branched and point-focal heat-transferring conduit in the configuration of an arterial vessel system within said mold or tool, wherein said system is in communication with one inlet and one outlet through which a heat-transferring medium can be respectively introduced and discharged; and causing the heat-transferring medium to flow through said heat-transferring conduit from the inlet to the outlet.

16. A process according to claim 15 further comprising the steps of circulating the heat-transferring medium within said heat-transferring conduit, discharging the heat-transferring medium through the outlet, passing the medium through the temperature-adjusting device, and introducing the medium again through the inlet.

17. The process according to claim 15 wherein the heat-transferring medium is a gas or liquid.

18. The process according to claim 17 wherein the phase conversion from liquid to gaseous state occurs inside said heat-transferring conduit.

19. The process according to claim 17 wherein the heat-transferring medium is water.

20. The process according to claim 17 wherein the heat-transferring medium is oil.

21. The process according to claim 17 wherein the heat-transferring medium is $N_2$ or $CO_2$, which can be introduced in liquid or gaseous state into said heat-transferring conduit.

* * * * *